United States Patent [19]

Kenol et al.

[11] 4,434,422

[45] Feb. 28, 1984

[54] DIGITAL SCAN CONVERTER WITH RANDOMIZED DECAY FUNCTION

[75] Inventors: Claude J. Kenol, Long Island City, N.Y.; Richard M. DeGeorge, Pullach, Fed. Rep. of Germany

[73] Assignee: Hazeltine Corporation, Commack, N.Y.

[21] Appl. No.: 254,363

[22] Filed: Apr. 15, 1981

[51] Int. Cl.³ .............................................. G01S 7/44
[52] U.S. Cl. .................................. 343/5 SC; 358/140; 434/2
[58] Field of Search ...................... 343/5 SC; 358/140; 434/2

[56] References Cited

U.S. PATENT DOCUMENTS

| | | | |
|---|---|---|---|
| 3,514,521 | 5/1970 | Burchard et al. ........................ | 434/2 |
| 3,631,483 | 12/1971 | Ruggles et al. .................... | 343/5 SC |
| 3,710,175 | 1/1973 | Halpern ......................... | 343/5 SC X |
| 3,810,174 | 5/1974 | Heard et al. ................. | 343/5 SC X |
| 3,838,420 | 9/1974 | Heard et al. ....................... | 343/5 SC |
| 3,902,171 | 8/1975 | Toth . | |
| 4,052,057 | 10/1977 | Castle . | |
| 4,148,070 | 4/1979 | Taylor ............................ | 358/140 X |
| 4,165,506 | 8/1979 | Brands et al. ................. | 343/5 SC X |

FOREIGN PATENT DOCUMENTS 2052910  1/1981  United Kingdom .

*Primary Examiner*—T. H. Tubbesing
*Attorney, Agent, or Firm*—E. A. Onders; F. R. Agovino

[57] ABSTRACT

Analog video information with a wide range of radar characteristics is converted by a digital scan converter into a standard TV format. The analog video information is converted to digital PPI data and stored in a buffer. The digital PPI data is consecutively integrated on a pulse to pulse basis to eliminate noise. The digital PPI data is then stored in an image memory (RAM). The polar coordinates of each digital PPI data sample are converted to an address of equivalent X, Y coordinates wherein each point along a TV line is an X coordinate and each TV line is a Y coordinate. This address defines the location at which the data is stored in the RAM. Each address of X, Y coordinates uniquely defines a cell in the RAM which is three bits deep, describing eight intensity levels. Data is read from the image memory in time sequence with a TV synchronization signal for display on a TV monitor. During TV memory cycles, an N element word is read from the RAM to drive the video output circuits, processed through a programmable read-only memory programmed in accordance with a randomized decay function and written back into the same memory address. During radar cycles, an N bit word is read from the image memory and one bit in each word is updated in accordance with the new radar data.

11 Claims, 3 Drawing Figures

DIGITAL SCAN CONVERTER WITH RANDOMIZED DECAY FUNCTION

BACKGROUND OF THE INVENTION

1. Field of the Invention

The invention relates generally to digital scan converters and, in particular, to a digital scan converter with a randomized decay function simulating the exponential decay of a selected cathode ray tube phosphor.

2. Description of the Prior Art

U.S. Pat. No. 4,165,506 discloses a control unit for the brightness of video on a raster scan display provided with a random-access memory (RAM). The data stored in each element of the RAM determines the brightness of the video signals on the raster scan display at a position corresponding with the element. In response to the video data supplied to the control unit and the brightness data in the RAM, a logic unit provides new brightness data which overwrites the brightness data stored in the RAM. This technique requires the use of extra memory cycles to achieve the desired change in brightness levels. In addition, an address and video data generator must address the RAM and modify the brightness data.

SUMMARY OF THE INVENTION

The invention is a digital scan converter for displaying on a raster scan display video data provided in PPI format by a sensor, such as a radar or sonar system. The converter includes logic circuitry for processing the video signals provided by the PPI sensor to be stored in a PPI data buffer at addresses corresponding to a scan pattern of the PPI sensor, which scans a field of view at a given first rate. An address generating means generates addresses as a function of the scan pattern and scanning rate of the PPI sensor to accommodate the data stored in the PPI data buffer at locations in a RAM corresponding to the display pattern to be realized on the raster scan display. A readout means is provided for serially reading out the data stored in the RAM so that the data may be presented on the raster scan display at a second given rate. The invention further includes means for modifying, in a selected manner, the data being read out by the readout means, and means for writing the modified data back into the same memory address. The invention particularly contemplates that the means for modifying and writing back the data includes a programmable read-only memory (PROM). The data in the RAM is presented to the PROM as an address thereby accessing within the PROM data for re-entry into the RAM.

It is an object of this invention to provide a digital scan converter which controls the brightness of video signals on a raster scan display by modifying data during TV cycles, thereby avoiding the need for additional memory cycles to achieve modification of the brightness.

It is another object of this invention to provide a digital scan converter including means for modifying data according to an exponential decay function and means for writing back into memory the modified data during TV cycles.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
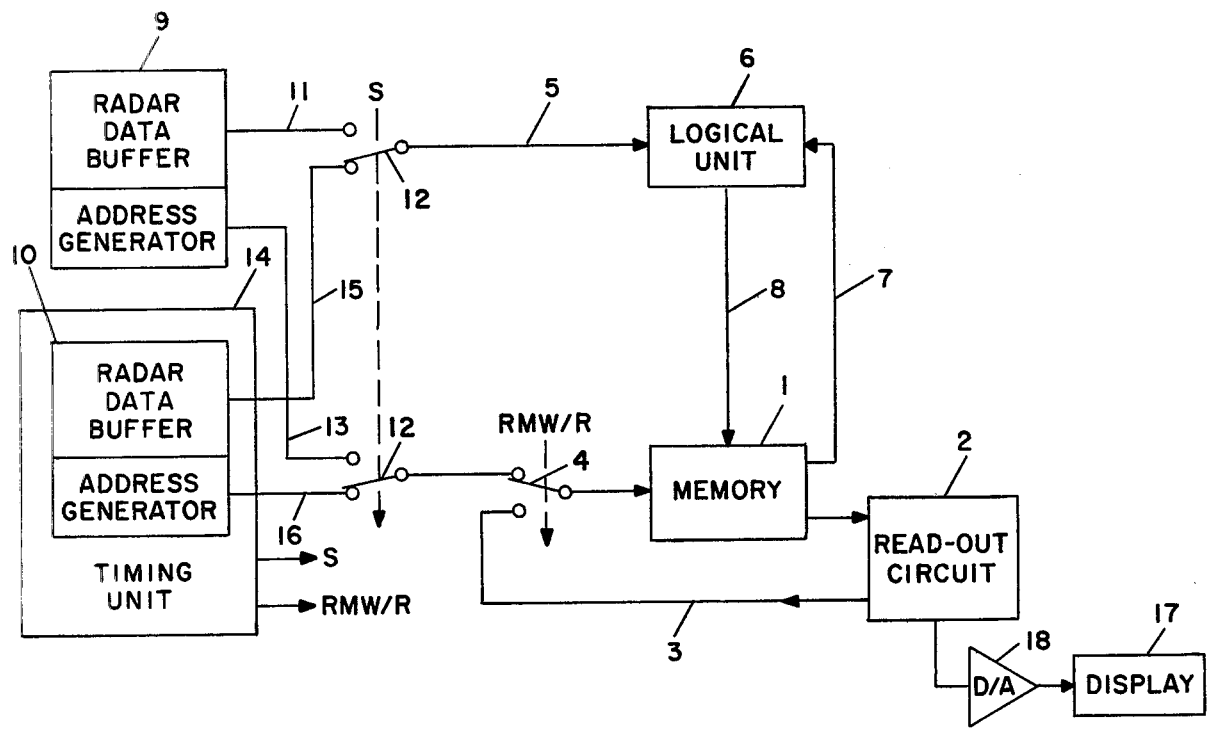
FIG. 1 is a block diagram illustrating the prior art control unit according to U.S. Pat. No. 4,165,506 by Brands et al.

In the prior art as shown in FIG. 1, the random-access memory (RAM) is referred to by reference character 1. Each element of RAM 1 corresponds with one displayable point pixel of a raster scan display and contains the information required for the display of video information at the corresponding point of raster scan display 17. The data stored in RAM 1 is read out at such a rate that a flicker-free picture is generated. Circuit 2, connected to RAM 1, is provided to read out the stored data, to process this data for the generation of video information through D/A converter 18 and to present these processed signals to the display 17.

Each memory element of RAM 1 comprises a given number of bit positions. The content of such a memory element determines the intensity at which radar information is presented as signals to the raster scan display at a position corresponding to the respective memory element. The content of a memory element is referred to as brightness data.

To read the brightness data out of RAM 1, circuit 2 supplies the required memory addresses via connection line 3 and switch 4. The RAM 1 is supplied alternatively via switch 4 with the address information of the video data to be processed (switch 4 in RMW position) and with the address information supplied by the circuit 2 (switch 4 in R position) for reading out brightness data from the RAM 1 for display.

During the radar mode, switch 4 is in the RMW (read/modify/write) position, so that memory elements are addressed and the content of each addressed element is re-established. The processed radar data is supplied to logic unit 6 via connection line 5. Also, the content of RAM 1 allocated by the address information of this radar data is fed to logic unit 6 via line 7. From the information supplied to logic unit 6, the content of the respective memory element is re-established via line 8.

The first address and video data generator 9 may consist of a radar receiver (not shown) in which case the radar data to be processed is composed of a quantized and digitized radar video signal with the addition of the relevant Cartesian coordinates of the memory element provided by an address generator. The quantized and digitized radar signal is applied to the logic unit 6 via line 11, switch 12 and line 5, while the corresponding Cartesial coordinate addresses are applied to RAM 1 via line 13 and switches 12 and 4.

The second address and video data generator 10, including a decay data buffer and a second address generator, forms part of a timing unit 14 and delivers command signals to the logic unit 6 via line 15, switch 12 and line 5 in order to alter the brightness data in RAM 1. The address information of the command signals is supplied to RAM 1 by generator 10 via line 16 and switches 12 and 4.

In general, the switch 12 is connected to line 11 for transmitting the quantized and digitized radar signal to the logic unit 6. At certain instances determined by the timing unit 14, switch 12 is connected to line 15. The timing unit 14 also determines the actuation of the RMW/R switch 4.

The first address and radar data generator 9 produces data on a real time basis, increasing the brightness level at which corresponding video signals are displayed. The second address generator 10 supplies data (command signals) at fixed instants of time decreasing the brightness level of brightness data stored in RAM 1.

Figure 2:
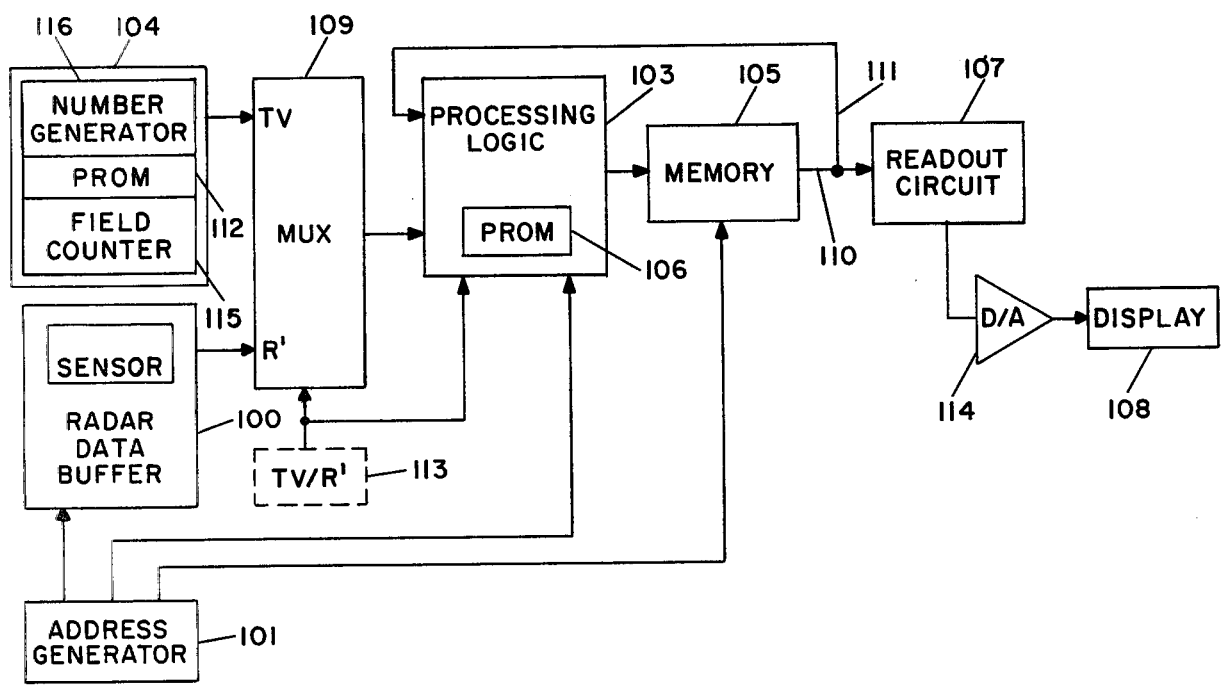
FIG. 2 is a functional block diagram of the digital scan converter according to the invention.

FIG. 2 illustrates a digital scan converter in simplified block form according to the invention. Analog video information provided in a PPI format by a sensor is converted to digital PPI data and stored in buffer 100. The digital PPI data is consecutively integrated by logic 103 on a pulse to pulse basis to eliminate noise. The digital PPI data is then stored in random-access memory (RAM) 105. Data is read from the RAM 105 in time sequence with a TV synchronization signal provided by readout circuit 107 so that a display pattern may be realized on display 108. During TV cycles, data in RAM 105 is decayed according to a selected decay function. During radar cycles, data in RAM 105 is updated.

The image memory data processing logic 103, including programmable read-only memory (PROM) 106, performs the data modifying operation. The data processing logic 103 includes a plurality of N PROMS, each of which operates on a three bit code (one data bit from each plane of the image memory) describing the intensity level of one element out of an N element word selected by the image memory address. The N-element word is processed in a parallel manner through logic 102, each of the N-PROMS associated with one of the N-elements of the word. RAM 105 stores brightness data defining one of eight (0–7) different levels of brightness at locations corresponding to the pattern to be realized on raster scan display 108. RAM 105 comprises three memory planes to store three bits of information, one bit per plane, digitally representing the level of brightness. Each plane contains a memory bit for each resolution element (pixel) of TV display 108 and is organized as 8k by N.

During TV cycles, an N-element word is read out of each of the three memory planes of RAM 105 by readout circuit 107 via line 110 for conversion into analog information by digital-to-analog converter (DAC) 114 to drive the video output circuits of raster scan display 108. Simultaneously, the N-element word is processed via line 111 by logic 103 through PROM 106 resulting in a randomized decay function (discussed below) being applied to the N-element word to create a modified word which is written back into the memory address of the original N-element word.

During radar (R') cycles, data in RAM-105 is updated in accordance with information provided by the PPI sensor. An N-element word is read from each of the three memory planes of RAM 105 via line 111 and presented to PROM 106 as a first portion of an address. New data is provided by radar data buffer 100 in response to the PPI sensor and an X-Y address generated by a polar-Cartesian converter forming a part of address generator 101. This new data is also presented to PROM 106 as the second portion of an address thereby accessing data within PROM 106. PROM 106 is programmed, when addressed in this manner during radar cycles, to have in its memory brightness data which corresponds, element-by-element, to the N-element word or the new data, whichever is of higher intensity. Therefore, PROM 106 provides a new N-element word which represents the original N-bit word modified in accordance with the new data provided by buffer 100. In summary, during radar cycles, an N-element word is presented to PROM 106 as an address along with corresponding new data and results in a new N-element word read from the memory of PROM 106. The new N-element word is then written back into the same memory address as the original N-element word. The speed of this data modifying operation is critical since this operation adds directly to the required memory cycle time.

Processing through Unit 103 is accomplished in the following manner. In general, data is presented to PROM 106 as an address. During radar cycles, particular addresses of PROM 106 access memory elements which have been programmed to store data corresponding to the greater of the existing and new data presented as the address. During TV cycles, particular addresses of PROM 106 access memory elements which have been programmed to store data corresponding to the particular addresses modified in accordance with the randomized decay function discussed below.

The randomized decay function provides a digital simulation of exponential phosphor decay equivalent to an analog plan position indicator (PPI). As data is written back into RAM 105 during the TV cycles, modifications occur periodically to achieve the selected decay function by reducing the stored intensity levels, one level at a time from maximum level 7 to minimum level 0. Higher intensity levels (greater than or equal to 4) are reduced more frequently than the lower levels to approximate the exponential nature of decay. The period between modifications is determined by the decay rate selected. In order to provide smooth transition from one level to the next, a randomized function is employed whereby only three elements of a selected N-element word are decayed during any given field and the selection of which three elements are decayed in successive N-element words throughout the display is done pseudo-randomly by decay generator 104 to avoid any recognizable decay pattern. As a target decays from level 7 to level 6, for example, the eye will integrate the effect of several elements at level 6 while other elements remain at level 7 and will see levels 6 and 7. The effect will be to smooth out the transition from 7 to 6.

It is important to guarantee that all of the elements within the N-element word will be decayed when the selection of elements is pseudo-randomly performed. Pseudo-random number generator 116 has a predictable output and is reset at the start of each field so that decay generator 104 always provides addresses of the same corresponding elements for a given N-element word in every field. The selected elements, which may be any number from 1 to N, are then subjected to decay processing through logic 103. The unselected elements are also processed through logic 103 but remain unchanged. PROM 112 is programmed with information defining the decay function specifying the rate at which data in the memory 105 will be reduced in value. This decay function is dependent upon the state of field counter 115. After the elements have been processed, the state of field counter 115 and the decay function stored in PROM 112, are used to reset and control psuedo-random number generator 116. Generator 116 is controlled to select, in a pseudo-random manner, elements from the previously unselected elements which have not been subject to decay processing. The newly selected elements are then subject to the same decay processing as the previously selected elements. This process continues until all elements of each N-element word is subjected to decay processing. The result is that all of the successive elements within any N-element word are decayed within N/M consecutive fields, where M is the number of elements per word subjected to decay processing during a given field.

OPERATION OF THE INVENTION

Analog video information with a wide range of radar characteristics is converted by the digital scan converter of the invention into a standard TV format. The analog video information is converted to digital data, retained in buffer 100 and integrated on a pulse to pulse basis by logic 103.

The image memory data processing logic 103 processes the data written into RAM 105 during each memory cycle. In a preferred embodiment, a 24 element word may be selected as the most convenient for proper image processing. However, any size word may be selected depending on timing and logic requirements.

During TV cycles, data is read out of RAM 105 by readout circuit 107 and converted to analog information by DAC 114 for presentation on display 108. Simultaneously, control 113 sets multiplexer 109 in the "TV" mode and the data read out of RAM 105 is decayed by the data processing logic 103 in accordance with the selected decay function of decay generator 104 and then written back into the memory. In particular, multiplexer 109 routes decay data from decay generator 104 for input into the logic 103 along with data being readout via line 110 and provided as an input to logic 103 via line 111.

During radar (R') cycles, the data processing logic 103 modifies elements of an N element word. Control 113 sets multiplexer in the "radar" (R') mode so that new radar data from buffer 100 is provided through multiplexer 109 to the data processing logic 103 for input into RAM 105. In this way, new radar data is written into the image memory at the rate of one element per radar cycle.

The decay simulates the exponential decay of a selected cathode ray tube phosphor. Decay takes place only during the TV display cycles when brightness data is read out of the image memory 105 in synchronism with the scanning of the TV beam thereby eliminating the need for separate memory cycles exclusively for decay processing. Furthermore, the fact that no additional memory cycles are required (since the stored brightness data is modified during memory cycles utilized for reading the data out of the memory for display), whereas the prior art technique of FIG. 1 requires the use of extra memory cycles to perform decay processing, is extremely important because the decay process does not limit the processing capability of the digital scan converter. In effect, the invention avoids the need for the second radar data buffer and address generator 10 required in the prior art, as illustrated in FIG. 1, to address the RAM 1 to accomplish modification of the brightness data.

Periodically, in accordance with the selected decay function programmed into PROM 112, data is reduced in intensity by one level. Elements at the higher intensity levels are decayed more frequently but in no instance is any element reduced more than one level during any field. To further smooth the decay, a randomized function is employed which decays only three elements of each N-element word during a given field. Pseudo-random decay generator 104 is reset at the start of each field and indicates which three of the N-elements will be decayed. The address of the three selected elements is then processed in accordance with the state of field counter 115 by PROM 112 which is part of the decay generator 104. The periodicity of the decay is determined by the decay code loaded into the field counter. In the case of a 24 element word, only three elements out of the 24 element word are decayed during a first given field. However, any number of elements may be decayed during a field. The remaining elements are decayed during the next seven fields, three at a time (i.e., at the same rate). Since the eye will integrate the light from a 24 element word, the transition between any two levels is smooth because some of the elements will be at the higher levels while others will be at the lower levels.

Figure 3:
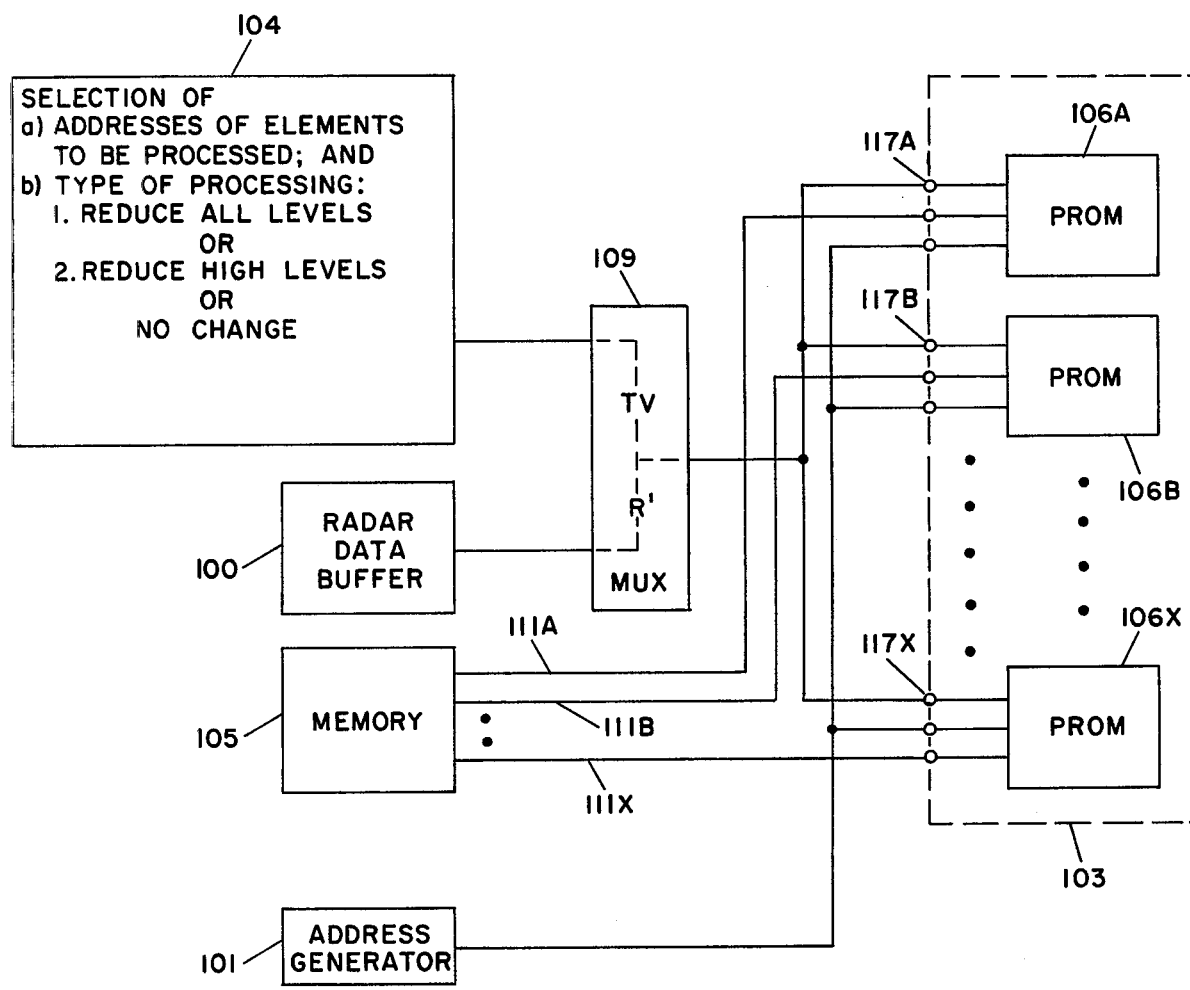
FIG. 3 is a functional block diagram illustrating data provided to the PROMS as an address.

For example, consider a digital scan converter according to the invention wherein N equals 24 and M equals 3. Furthermore, consider that PROM 112 is programmed so that the following decay function is effected: During every 8 fields, elements at a level of 4 or greater are reduced one level; during every 16 fields, all elements are reduced so that elements at a level below 4 are reduced one level every 16 fields FIG. 3 is a functional block diagram of addresses 117A, 117B, . . . , 117X provided to PROMS 106A, 106B, . . . , 106X, respectively, of logic 103. Decay generator 104 determines: (a) the addresses of the three elements of the 24-element word which will be considered for reduction during each field; and (b) the type of processing of the three elements in accordance with the decay function programmed into PROM 112. In this example, elements would be considered for reduction in accordance with the following table:

TABLE ONE

| Field | Cumulative Total of Elements Considered for Reduction | Type of Elements Considered for Reduction |
|---|---|---|
| 1 | 3 | >3 |
| 2 | 6 | >3 |
| 3 | 9 | >3 |
| 4 | 12 | >3 |
| 5 | 15 | >3 |
| 6 | 18 | >3 |
| 7 | 21 | >3 |
| 8 | 24 | >3 |
| 9 | 3 | ALL |
| 10 | 6 | ALL |
| 11 | 9 | ALL |
| 12 | 12 | ALL |
| 13 | 15 | ALL |
| 14 | 18 | ALL |
| 15 | 21 | ALL |
| 16 | 24 | ALL |

During each field, a 24-element word is provided by memory 105 so that as illustrated in FIG. 3, one element from the word is provided along each of lines 111A, 111B, . . . , 111X to one of the 24 PROMS 106 and logic 103. Multiplexer 109 is set in the TV mode, thereby providing data from decay generator 104 to the PROMS 106. This information is provided to PROMS 106 as address 117. At field number 1, number generator 116 is reset and randomly selects three of the twenty-four elements A, B, . . . , X to be considered for reduction. The three elements are selected by providing to PROMS 106, along with the elements, an address which results in PROMS 106 outputting data which corresponds to the elements of level four or greater reduced by one level. Suppose, for example, elements B, G and K are chosen for consideration for reduction. The address provided to PROMS 106B, 106G and 106K will result in PROMS 106B, 106G and 106K outputting data which corresponds to elements B, G and K reduced by one level if these elements are at levels four or greater. The address provided to PROMS 106A, 106C–106F and 106L–106X will result in PROMS 106A, 106C–106F and 106L–106X outputting data which corresponds to elements A, C–F and L–X, respectively. At the end of field number 1, number generator 116 is reset by PROM 112 and, since field counter 115 has counted one field completed, the number generator is reset to randomly select three elements from the remaining 21 elements which have not yet been considered for reduction. Since number generator 116 is of a pseudo-random type, the output of generator 116 is predictable. Therefore, the three elements which have been considered for reduction during field number one is known because generator 116 was reset at the start of field number one. As a result, the remaining 21 elements are known.

This process continues until all 24-elements have been considered for reduction during the first eight fields. During the ninth field, PROM 112 resets the number generator 116 to pseudo-randomly select three elements of the 24-element word to be considered for reduction. In addition, PROM 112 provides addresses which now addresses PROMS 106 to result in all elements being reduced one level. During fields 9–16, the number generator 116 again randomly selects the elements to be considered for reduction. The three elements are selected by providing to PROMS 106, along with the elements, an address which results in PROMS 106 outputting data which corresponds to all element levels reduced by one level. The end result, after sixteen fields, is that every element having the level of four or greater has been reduced in intensity by two levels and every element having an intensity of three or less has been reduced in intensity by one level.

During radar cycles, multiplexer 109 is set in the radar (R') mode. Address generator 101 provides addresses to PROMS 106 along with the 24-element word from memory 105 and the new element of updated radar from buffer 100. This results in accessing data in PROMS 106 which corresponds to the 24-element word having one-element updated by the radar information in buffer 100. In general, PROMS 106 may be programmed to provide the higher of the element in memory 105 to be updated and the corresponding element in buffer 100. Control 113 is connected to multiplexer 109 and logic 103 for effecting this result during radar cycles.

This pseudo-random decay effect provides a smooth decay. The prior art as illustrated in FIG. 1 generates memory addresses in a pseudo-random fashion to effect a reduction in the display brightness as uniformly as possible. In contrast, the invention contemplates addressing words of N elements (pixels) from the memory sequentially for readout to the display. The particular element or elements in a given word which will be decayed is then selected in a pseudo-random fashion. The result is a smooth decay because, after a given number of fields, all elements of each word will have been reduced one level in intensity.

While there has been described what are at present considered to be the preferred embodiment of this invention. It will be obvious to those skilled in the art that various changes and modifications may be made therein without departing from the invention and it is, therefore, aimed to cover all such changes and modifications as fall within the true spirit and scope of the invention.

What is claimed is:

1. In a digital scan converter for displaying, on a raster scan display, video data provided by a sensor, wherein said converter includes a random-access memory (RAM) for storing said video data at locations corresponding to the display pattern to be realized on the raster scan display, and a read-out circuit for reading out, during display cycles, said video data stored in the RAM for presentation on the raster scan display, the improvement comprising:
   generating means for pseudo-randomly selecting the memory addresses of particular elements of said video data to be modified;
   multiplexing means for providing, during display cycles, the selected memory addresses;
   means responsive to the selected memory addresses for storing in said RAM, during display cycles, modified data which corresponds to the video data stored in the RAM with the elements located at the selected addresses modified in a selected manner; whereby said modified data is written back at the memory address of the original video data corresponding to said modified data.

2. The digital scan converter of claim 1 wherein said means for storing comprises processing logic having a programmable read-only memory (PROM), said logic for providing said video data stored in the RAM as an address to said PROM, said PROM being programmed with data which, at a given PROM address, corresponds to said original video data modified in the selected manner.

3. The digital scan converter of claim 1 wherein said generating means comprises means for sequentially addressing words of N-elements in the RAM and means for pseudo-randomly selecting M-elements of said word for modification such that, after N/M modifications, each of the N-elements of said word will be decayed according to a selected decay function, where M is a positive integer and N is a multiple of M.

4. The digital scan converter of claim 3 wherein said generating means comprises a psuedo-random number generator specifying the addresses of the M-elements to be modified, a counter for resetting said generator, and a PROM programmed with data for defining the selected decay of the M selected bits.

5. A digital scan converter for displaying, on a raster scan display, video data provided in a plan position indicator (PPI) format by a PPI sensor, said converter comprising:
   (a) first means for storing said video data;
   (b) a random-access memory (RAM);
   (c) second means for generating addresses as a function of the scan pattern and scanning rate of the PPI sensor to accommodate the data stored by said first means at locations of said RAM corresponding to the display pattern to be realized on the raster scan display;
   (d) third means for reading out the data stored in said RAM, for presentation on the raster scan display;
   (e) generating means for pseudo-randomly selecting data being read-out by the third means; and (f) processing logic means for transferring the data stored by the first means into said RAM and for modifying data selected by the generating means and writing said modified data back into the RAM at the memory address of the original read-out data.

6. The digital scan converter of claim 5 wherein said processing logic means comprises a programmable read-only memory (PROM) and means for providing the data in the RAM as an address to said PROM, said PROM being programmed to store data which, at a given memory address, corresponds to said original read-out data modified in the selected manner.

7. The digital scan converter of claim 5 wherein said generating means comprises means for sequentially addressing a word of N-elements in the RAM during each field of the display and means for psuedo-randomly selecting M-elements of said word for modification such that, after N/M fields of display, each of the N-elements in the word will be decayed according to a selected decay function, where M is a positive integer and N is a multiple of M.

8. The digital scan converter of claim 7 wherein said generating means comprises a pseudo-random number generator specifying the addresses of the M-elements to be modified, a field counter for resetting said generator and a PROM programmed with data for defining the selected decay of the M selected elements.

9. In a digital scan converter for displaying, on a raster scan display, video data provided by a radar sensor, wherein said converter includes a random-access memory (RAM) for storing said video data provided by the radar sensor at locations corresponding to the display pattern to be realized on the raster scan display, and a read-out circuit for reading out, during display cycles, said video data stored in the RAM for presentation on the raster scan display, a method of decaying data stored in the RAM, said method comprising the steps of:

pseudo-randomly selecting the memory addresses of particular elements of said video data to be modified;

modifying, during display cycles, selected elements of said video data as the selected elements are read-out by the read-out circuit; and writing back the modified video data at the memory address of the original video data corresponding to said modified video data.

10. The method of claim 9 wherein the steps of modifying and writing back further comprises providing the video data in the RAM as an address to a programmable read-only memory (PROM) during each field of the display and entering data addressed in said PROM in the RAM at the memory address of the video data corresponding to said processed video data.

11. The method of claim 9 wherein the steps of modifying and writing back further comprises sequentially addressing a word of N bits from the RAM and selecting M bits of said word for modification such that, after N/M fields of display, each of the N bits in the word will be decayed according to a selected decay function, where M is a positive integer and N is a multiple of M.

* * * * *